US012613990B2

(12) United States Patent
Jain et al.

(10) Patent No.: US 12,613,990 B2
(45) Date of Patent: Apr. 28, 2026

(54) AUTOMATED FILE INFORMATION POPULATION EXHIBITING REDUCED STORAGE AND BANDWIDTH AND INCREASED SECURITY

(71) Applicant: ServiceNow, Inc., Santa Clara, CA (US)

(72) Inventors: Akanksha Jain, Hyderabad (IN); Suresh Aelidhe, Hyderabad (IN); Srikanta Venkata Raju Sanka, Hyderabad (IN); Sangshu Huang, Santa Clara, CA (US); Mauri Paz, Santa Clara, CA (US); Vasant Balasubramanian, Santa Clara, CA (US); Bhuvaneshwari Chandrasekharan, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 265 days.

(21) Appl. No.: 18/506,731

(22) Filed: Nov. 10, 2023

(65) Prior Publication Data

US 2025/0156573 A1     May 15, 2025

(51) Int. Cl.
*G06F 21/62*          (2013.01)

(52) U.S. Cl.
CPC ................................ *G06F 21/6227* (2013.01)

(58) Field of Classification Search
CPC ............. G06F 21/6227; G06F 16/2428; G06F 16/2423; H04L 43/06; G06Q 10/10
See application file for complete search history.

(56) References Cited

U.S. PATENT DOCUMENTS 4,941,084 A     7/1990   Terada
5,185,860 A     2/1993   Wu
(Continued)

FOREIGN PATENT DOCUMENTS

EP          0433979 A2     6/1991
EP          1607824 A2     12/2005
(Continued)

OTHER PUBLICATIONS

"How do I pull text from SQL (MySQL for example) to fill out a text template? General advice appreciated", obtained online from <https://stackoverflow.com/questions/71214838/how-do-i-pull-text-from-sql-mysql-for-example-to-fill-out-a-text-template-gen>, retrieved on Sep. 30, 2025 (Year: 2022).*
(Continued)

*Primary Examiner* — Zhimei Zhu
(74) *Attorney, Agent, or Firm* — McDonnell Boehnen Hulbert & Berghoff LLP

(57)          ABSTRACT

Embodiments are provided herein that improve the automated generation and auditing of data-bearing reports. These embodiments include using metadata to represent the sources of data to be used to insert information at various locations within a report or other text record. To populate the report, the metadata is used to determine a source to query for the relevant information, a location to insert the relevant information within the text, and optionally a calculation to perform on the source data in order to determine the relevant information. These embodiments result in improved data security and reduced bandwidth and storage cost while also improving report accuracy and allowing for repeated report information updates as the underlying source data is accumulated and/or updated.

19 Claims, 9 Drawing Sheets

Refresh all links...

Updating Linked Data

☑ Data (40)                              ⌄

☑ Metric Data/Metric data by entity/1915
    Updated on 2/8/2023

☑ Metric Data/Metric data by entity/1409
    Updated on 2/8/2023

☑ Metric Data/Metric data by entity/117722
    Updated on 2/8/2023

☑ Metric Data/Metric data by entity/131770
    Updated on 2/8/2023

☑ Metric Data/Metric data by entity/72201
    Updated on 2/8/2023

☑ Metric Data/Metric data by entity/62280
    Updated on 2/8/2023

☑ Metric Data/Metric data by entity/32272
    Updated on 2/8/2023

(56)                References Cited

U.S. PATENT DOCUMENTS

| | | | |
|---|---|---|---|
| 5,237,518 A | 8/1993 | Sztipanovits | |
| 5,261,097 A | 11/1993 | Saxon | |
| 5,265,252 A | 11/1993 | Rawson, III | |
| 5,367,685 A | 11/1994 | Gosling | |
| 5,390,297 A | 2/1995 | Barber | |
| 5,442,791 A | 8/1995 | Wrabetz | |
| 5,452,415 A | 9/1995 | Hotka | |
| 5,522,042 A | 5/1996 | Fee | |
| 5,533,116 A | 7/1996 | Vesterinen | |
| 5,655,081 A | 8/1997 | Bonnell | |
| 5,659,736 A | 8/1997 | Hasegawa | |
| 5,671,412 A | 9/1997 | Christiano | |
| 5,696,701 A | 12/1997 | Burgess | |
| 5,715,463 A | 2/1998 | Merkin | |
| 5,745,879 A | 4/1998 | Wyman | |
| 5,761,502 A | 6/1998 | Jacobs | |
| 5,764,913 A | 6/1998 | Jancke | |
| 5,887,139 A | 3/1999 | Madison, Jr. | |
| 5,909,217 A | 6/1999 | Bereiter | |
| 5,937,165 A | 8/1999 | Schwaller | |
| 5,949,976 A | 9/1999 | Chappelle | |
| 5,978,594 A | 11/1999 | Bonnell | |
| 6,021,437 A | 2/2000 | Chen | |
| 6,041,347 A | 3/2000 | Harsham | |
| 6,088,717 A | 7/2000 | Reed | |
| 6,101,500 A | 8/2000 | Lau | |
| 6,128,016 A | 10/2000 | Coelho | |
| 6,131,118 A | 10/2000 | Stupek, Jr. | |
| 6,134,581 A | 10/2000 | Ismael | |
| 6,138,122 A | 10/2000 | Smith | |
| 6,148,335 A | 11/2000 | Haggard | |
| 6,166,732 A | 12/2000 | Mitchell | |
| 6,167,448 A | 12/2000 | Hemphill | |
| 6,175,866 B1 | 1/2001 | Holloway | |
| 6,175,878 B1 | 1/2001 | Seaman | |
| 6,260,050 B1 | 7/2001 | Yost | |
| 6,263,457 B1 | 7/2001 | Anderson | |
| 6,272,150 B1 | 8/2001 | Hrastar | |
| 6,336,138 B1 | 1/2002 | Caswell | |
| 6,360,246 B1 * | 3/2002 | Begley | H04L 69/329 |
| | | | 709/217 |
| 6,363,421 B2 | 3/2002 | Barker | |
| 6,393,386 B1 | 5/2002 | Zager | |
| 6,397,245 B1 | 5/2002 | Johnson, II | |
| 6,434,626 B1 | 8/2002 | Prakash | |
| 6,438,592 B1 | 8/2002 | Killian | |
| 6,456,306 B1 | 9/2002 | Chin | |
| 6,466,932 B1 | 10/2002 | Dennis | |
| 6,487,590 B1 | 11/2002 | Foley | |
| 6,505,248 B1 | 1/2003 | Casper | |
| 6,526,442 B1 | 2/2003 | Stupek, Jr. | |
| 6,621,823 B1 | 9/2003 | Mellquist | |
| 6,707,795 B1 | 3/2004 | Noorhosseini | |
| 6,742,015 B1 | 5/2004 | Bowman-Amuah | |
| 6,763,380 B1 | 7/2004 | Mayton | |
| 6,816,898 B1 | 11/2004 | Scarpelli | |
| 6,895,586 B1 | 5/2005 | Brasher | |
| 6,948,175 B1 | 9/2005 | Fong | |
| 6,985,901 B1 | 1/2006 | Sachse | |
| 7,003,564 B2 | 2/2006 | Greuel | |
| 7,028,228 B1 | 4/2006 | Lovy | |
| 7,043,537 B1 | 5/2006 | Pratt | |
| 7,043,661 B2 | 5/2006 | Valadarsky | |
| 7,062,683 B2 | 6/2006 | Warpenburg | |
| 7,096,459 B2 | 8/2006 | Keller | |
| 7,146,574 B2 | 12/2006 | Goldthwaite | |
| 7,197,466 B1 | 3/2007 | Peterson | |
| 7,215,360 B2 | 5/2007 | Gupta | |
| 7,216,304 B1 | 5/2007 | Gourdol | |
| 7,222,147 B1 | 5/2007 | Black | |
| 7,281,170 B2 | 10/2007 | Taylor | |
| 7,412,502 B2 | 8/2008 | Fearn | |
| 7,472,113 B1 * | 12/2008 | Watson | G06F 16/24534 |
| | | | 707/999.005 |
| 7,505,872 B2 | 3/2009 | Keller | |
| 7,558,841 B2 * | 7/2009 | Taboada | G06Q 30/0625 |
| | | | 709/219 |
| 7,593,013 B2 | 9/2009 | Agutter | |
| 7,596,716 B2 | 9/2009 | Frost | |
| 7,617,073 B2 | 11/2009 | Trinon | |
| 7,660,731 B2 | 2/2010 | Chaddha | |
| 7,676,294 B2 | 3/2010 | Baier | |
| 7,676,437 B2 | 3/2010 | Satkunanathan | |
| 7,840,490 B1 | 11/2010 | Sellers | |
| 7,877,783 B1 | 1/2011 | Cline | |
| 7,890,869 B1 | 2/2011 | Mayer | |
| 7,966,398 B2 | 6/2011 | Wiles, Jr. | |
| 8,060,396 B1 | 11/2011 | Bessler | |
| 8,196,210 B2 | 6/2012 | Sterin | |
| 8,321,948 B2 | 11/2012 | Robinson | |
| 8,407,669 B2 | 3/2013 | Yee | |
| 8,429,519 B2 * | 4/2013 | Parks | G06F 40/12 |
| | | | 715/239 |
| 8,554,750 B2 | 10/2013 | Rangarajan | |
| 8,595,647 B2 | 11/2013 | Sabin | |
| 8,620,818 B2 | 12/2013 | Hughes | |
| 8,646,093 B2 | 2/2014 | Myers | |
| 8,674,992 B2 | 3/2014 | Poston | |
| 8,725,647 B2 | 5/2014 | Disciascio | |
| 9,053,460 B2 | 6/2015 | Gilbert | |
| 10,673,963 B2 | 6/2020 | Feiguine | |
| 10,749,943 B1 | 8/2020 | Feiguine | |
| 10,771,344 B2 | 9/2020 | Bitterfeld | |
| 10,824,650 B2 | 11/2020 | Bar Oz | |
| 10,944,654 B2 | 3/2021 | Rimar | |
| 10,999,152 B1 | 5/2021 | Bar Oz | |
| 11,025,481 B1 | 6/2021 | Louca | |
| 11,089,115 B2 | 8/2021 | Garty | |
| 11,095,506 B1 | 8/2021 | Erblat | |
| 11,275,580 B2 | 3/2022 | Tamir | |
| 11,277,475 B1 | 3/2022 | Tal | |
| 11,281,442 B1 | 3/2022 | Tal | |
| 11,296,922 B2 | 4/2022 | Leibkowiz | |
| 11,301,503 B2 | 4/2022 | Burli | |
| 11,379,089 B2 | 7/2022 | Goswami | |
| 11,451,573 B2 | 9/2022 | Waplington | |
| 11,470,107 B2 | 10/2022 | Waplington | |
| 11,632,303 B2 | 4/2023 | Bitterfeld | |
| 11,640,369 B2 | 5/2023 | Bhogle | |
| 2002/0036662 A1 * | 3/2002 | Gauthier | G06F 40/18 |
| | | | 715/835 |
| 2002/0116340 A1 | 8/2002 | Hellberg | |
| 2002/0133584 A1 | 9/2002 | Greuel | |
| 2002/0158969 A1 | 10/2002 | Gupta | |
| 2003/0101416 A1 * | 5/2003 | McInnes | G06F 40/174 |
| | | | 715/234 |
| 2003/0118087 A1 | 6/2003 | Goldthwaite | |
| 2003/0200293 A1 | 10/2003 | Fearn | |
| 2005/0015217 A1 | 1/2005 | Weidl | |
| 2005/0091356 A1 | 4/2005 | Izzo | |
| 2006/0026453 A1 | 2/2006 | Frost | |
| 2006/0080142 A1 * | 4/2006 | Hart | G16H 10/60 |
| | | | 705/2 |
| 2006/0095461 A1 | 5/2006 | Raymond | |
| 2006/0179058 A1 | 8/2006 | Bram | |
| 2006/0293942 A1 | 12/2006 | Chaddha | |
| 2007/0033279 A1 | 2/2007 | Battat | |
| 2007/0188494 A1 | 8/2007 | Agutter | |
| 2007/0288389 A1 | 12/2007 | Vaughan | |
| 2008/0133289 A1 | 6/2008 | Armour | |
| 2008/0148253 A1 | 6/2008 | Badwe | |
| 2008/0319779 A1 | 12/2008 | Hughes | |
| 2009/0088875 A1 | 4/2009 | Baier | |
| 2009/0157447 A1 | 6/2009 | Busch | |
| 2009/0228984 A1 | 9/2009 | Sterin | |
| 2009/0307190 A1 * | 12/2009 | Maresca | G06F 16/245 |
| 2010/0110932 A1 | 5/2010 | Doran | |
| 2010/0205206 A1 * | 8/2010 | Rabines | G06F 21/6218 |
| | | | 707/769 |
| 2012/0143958 A1 * | 6/2012 | Augustine | G06Q 10/10 |
| | | | 709/205 |
| 2013/0139046 A1 * | 5/2013 | Chang | G06Q 10/10 |
| | | | 715/227 |

(56) References Cited

U.S. PATENT DOCUMENTS

| | | | |
|---|---|---|---|
| 2015/0169515 A1* | 6/2015 | Hagen | G06F 40/186 |
| | | | 707/756 |
| 2017/0177464 A1* | 6/2017 | Raman | G06F 21/6227 |
| 2018/0123940 A1 | 5/2018 | Rimar | |
| 2019/0073257 A1 | 3/2019 | Dasgupta | |
| 2019/0104398 A1 | 4/2019 | Owen | |
| 2020/0050689 A1 | 2/2020 | Tal | |
| 2020/0073917 A1 | 3/2020 | Choe | |
| 2020/0204443 A1 | 6/2020 | Bar Oz | |
| 2020/0301678 A1 | 9/2020 | Burman | |
| 2021/0194764 A1 | 6/2021 | Badyan | |
| 2022/0029886 A1 | 1/2022 | Hameiri | |
| 2023/0090136 A1 | 3/2023 | Billeter | |
| 2023/0153404 A1* | 5/2023 | Burtoft | G06F 21/316 |
| | | | 726/7 |

FOREIGN PATENT DOCUMENTS

| | | | |
|---|---|---|---|
| WO | 9934285 W | 7/1999 |
| WO | 0052559 W | 9/2000 |
| WO | 0179970 W | 10/2001 |

OTHER PUBLICATIONS

"How can I set up placeholder text that updates everywhere?", obtained online from <https://learn.microsoft.com/en-us/answers/questions/4965073/how-can-i-set-up-placeholder-text-that-updates-eve>, retrieved on Dec. 13, 2025. (Year: 2017).*

ServiceNow, Microsoft 365 for ServiceNow Reporting, https://store.servicenow.com/sn_appstore_store.do#!/store/application/046d129577aa5110164dc8ceca5a99e8/16.0.1, downloaded from Internet on Jun. 14, 2023.

* cited by examiner

In 2021, we improved and expanded our GHG emissions inventory methodology by using a climate software platform for reporting against our environmental metrics. We used this reporting methodology and applied it to previously reported 2019 and 2020 emissions. The adjusted data is reflected below. This data was then used to calculate our carbon footprint. Additional details are footnoted where applicable.

Our data was verified by Apex, a third party, in accordance with ISO 14064-3

Greenhouse gas emissions (mtCO2e)

| | 2019 (baseline) | 2020 | 2021 |
|---|---|---|---|
| Scope 1 | 1915 | 1401 | 11722 |
| Scope 2 (Market-based) | | | |
| Scope 3 - Purchased goods and services | 131770 | 72201 | 62280 |
| Scope 3 - Capital goods | 32272 | 2818 | 3006 |
| Scope 3 - Fuel and energy related activities | 3019 | 1191 | 371 |
| Scope 3 - Waste generated in operations | 0 | 22948 | 8943 |
| Scope 3 - Business travel | 3860 | 12766 | 10333 |
| Scope 3 - Employee commuting (including work from home) | 7495 | 7495 | 41682.00 |

FIG. 6

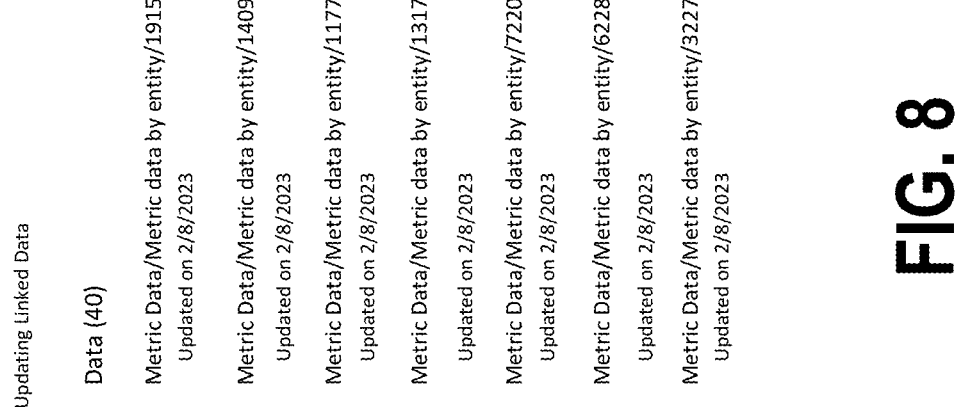

Refresh all links...

Updating Linked Data

Data (40)

Metric Data/Metric data by entity/1915
Updated on 2/8/2023

Metric Data/Metric data by entity/1409
Updated on 2/8/2023

Metric Data/Metric data by entity/117722
Updated on 2/8/2023

Metric Data/Metric data by entity/131770
Updated on 2/8/2023

Metric Data/Metric data by entity/72201
Updated on 2/8/2023

Metric Data/Metric data by entity/62280
Updated on 2/8/2023

Metric Data/Metric data by entity/32272
Updated on 2/8/2023

FIG. 8

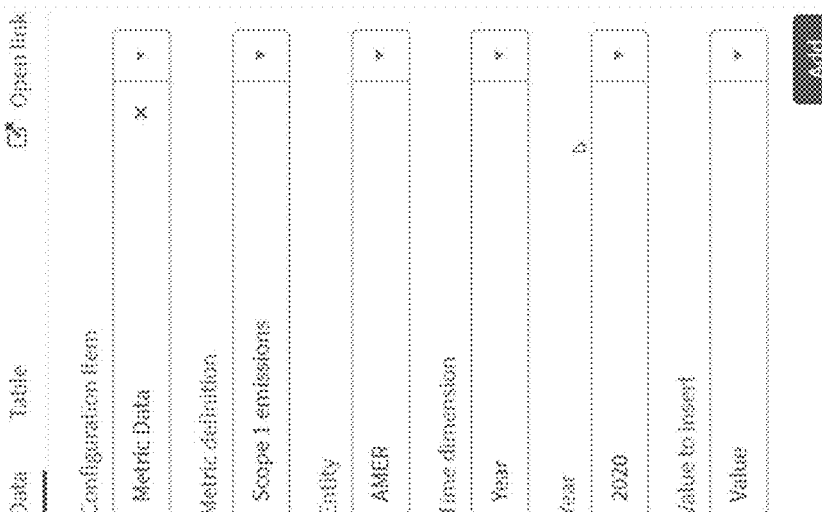

Data   Table      Open link

Configuration Item

Metric Data    x

Metric Attribution

Scope 1 emissions

Entity

AMER

Time dimension

Year

Year

2020

Value to Insert

Value

FIG. 7

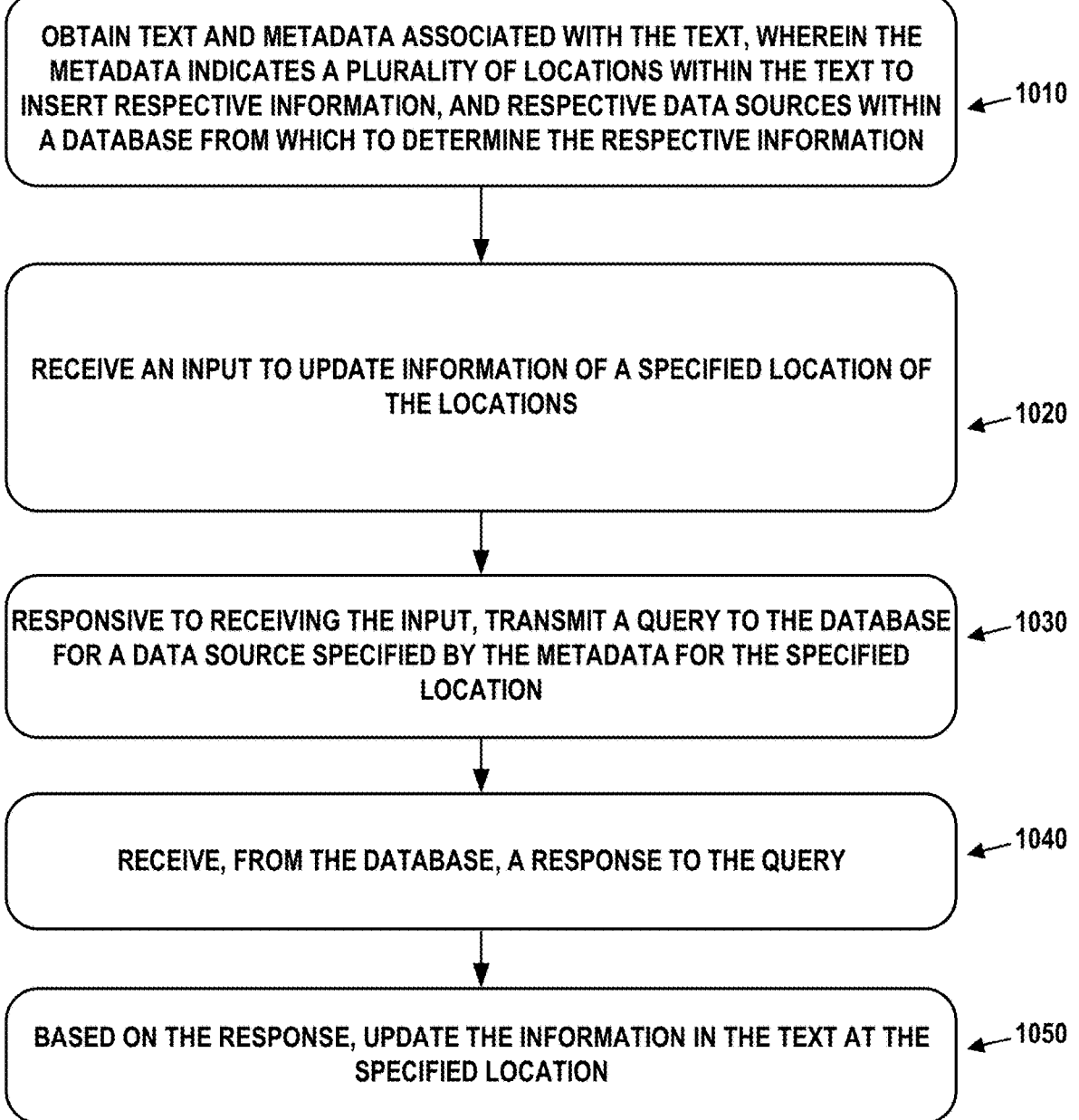

OBTAIN TEXT AND METADATA ASSOCIATED WITH THE TEXT, WHEREIN THE METADATA INDICATES A PLURALITY OF LOCATIONS WITHIN THE TEXT TO INSERT RESPECTIVE INFORMATION, AND RESPECTIVE DATA SOURCES WITHIN A DATABASE FROM WHICH TO DETERMINE THE RESPECTIVE INFORMATION ←1010

RECEIVE AN INPUT TO UPDATE INFORMATION OF A SPECIFIED LOCATION OF THE LOCATIONS ←1020

RESPONSIVE TO RECEIVING THE INPUT, TRANSMIT A QUERY TO THE DATABASE FOR A DATA SOURCE SPECIFIED BY THE METADATA FOR THE SPECIFIED LOCATION ←1030

RECEIVE, FROM THE DATABASE, A RESPONSE TO THE QUERY ←1040

BASED ON THE RESPONSE, UPDATE THE INFORMATION IN THE TEXT AT THE SPECIFIED LOCATION ←1050

FIG. 10

AUTOMATED FILE INFORMATION POPULATION EXHIBITING REDUCED STORAGE AND BANDWIDTH AND INCREASED SECURITY

BACKGROUND

Reports regarding the operation of a managed network or other system can be generated based on part on prose (e.g., generated by an author to explain and provide context) and in part on measurements or other data. For example, the other data may be from a database containing information about the contents, configuration, and operation of a managed network. Such reports may be useful for monitoring energy and material use, to summarize network operations, sustainability, or other concerns, or to represent the configuration and operation of a system in some other context and/or for some other reason.

In practice, the measurements or other data for such reports are manually added into reports. This is a time- and labor-intensive process, prone to errors. Additionally some of the data may not be natively available (e.g., means or other computations across time series of data points) and/or may be updated periodically, rendering a report out of date and in need of update.

SUMMARY

It is desirable in a variety of applications to generate reports or other files that include both human-language text (e.g., providing context, organizing the structure of the report, providing human-interpretable analyses or conclusions) and measurements or other data (e.g., numerical data, classifications, charts) to support the text. Such reports can be generated manually, by copying the relevant data from data sources (e.g., databases) and optionally performing computations on the data (e.g., generating a mean of a plurality of data points across a year or other time period). However, such manual operation can take significant time, is susceptible to errors, is difficult to audit, and can be rendered out of date (e.g., by updates to the underlying data sources), requiring the data to be updated.

Embodiments described herein provide improvements by including, in a report file, text and metadata indicating both the information to be inserted into the text of the report and where in the text to insert the information. Such metadata also records the data source(s) in a database to access in order to generate the information to be inserted. Such metadata can be evaluated in an automated fashion, reducing the time to generate the report from the file, reducing the likelihood of such data being copied erroneously, and allowing the data to be quickly and easily updated to reflect any changes in the underlying data sources. Such metadata in a file also facilitate auditing, by providing a record of the source of the data used to generate the information inserted into a report.

Additionally, the server could maintain the database, could be collocated with a system that maintains the database, or could be configured in some other way to have an improved (e.g., higher-bandwidth, lower cost, more secure) connection with the database, thereby providing security or other benefits with respect to the communication of the full set of data sources from the database relative to transmitting such information to the remote system. Such operation could also provide further improvements to data security by allowing individual users to have authorization to access summary data (e.g., averages, minimums, maximums) of certain data sources at certain temporal resolutions (e.g., at a monthly level for daily data, or at an annual level for monthly data) without providing access to the full-resolution data underlying such summary data.

Accordingly, a first example embodiment may involve a method that includes: (i) obtaining text and metadata associated with the text, wherein the metadata indicates a plurality of locations within the text to insert respective information, and respective data sources within a database from which to determine the respective information; (ii) receiving an input to update information of a specified location of the locations; (iii) responsive to receiving the input, transmitting a query to the database for a data source specified by the metadata for the specified location; (iv) receiving, from the database, a response to the query; and (v) based on the response, updating the information in the text at the specified location.

A second example embodiment may involve a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6 depicts text, in accordance with example embodiments.

FIG. 7 depicts an example user interface, in accordance with example embodiments.

FIG. 8 depicts an example user interface, in accordance with example embodiments.

FIG. 10 is a flow chart, in accordance with example embodiments.

DETAILED DESCRIPTION

Figure 1:
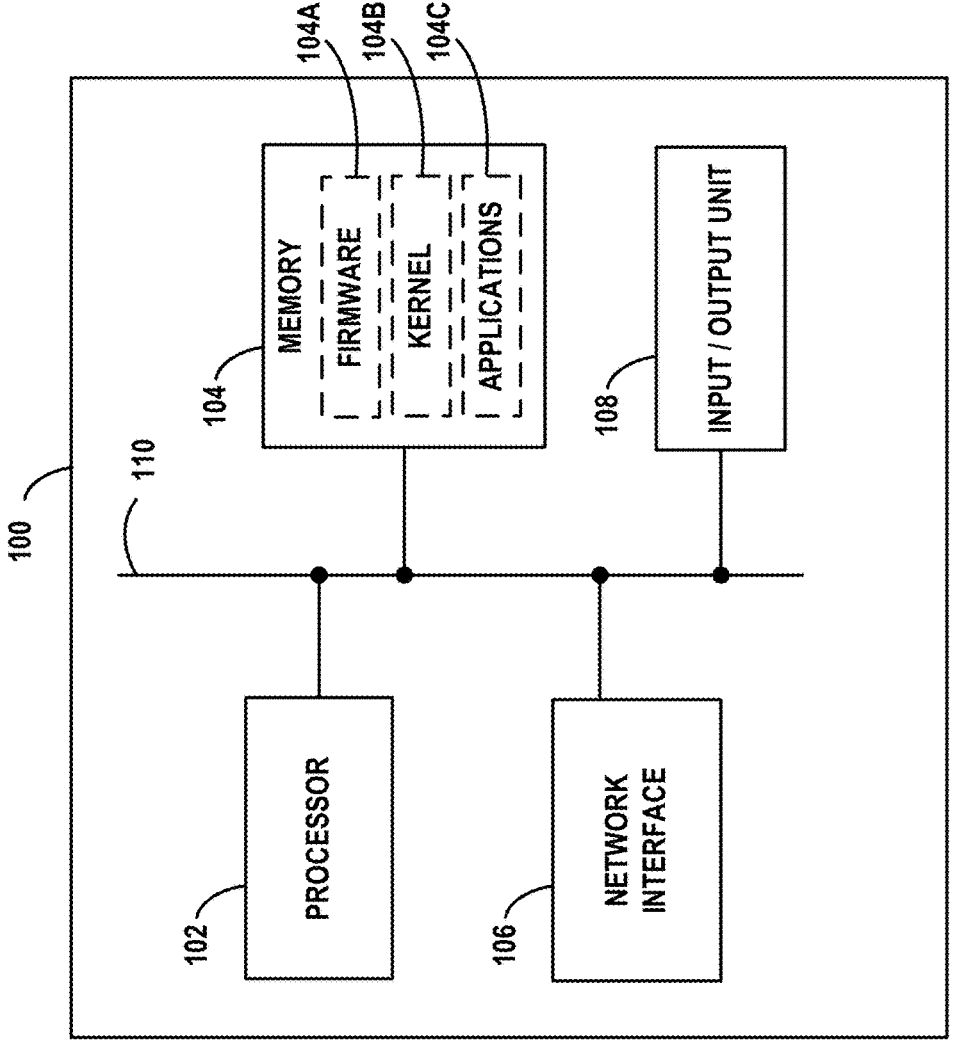
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
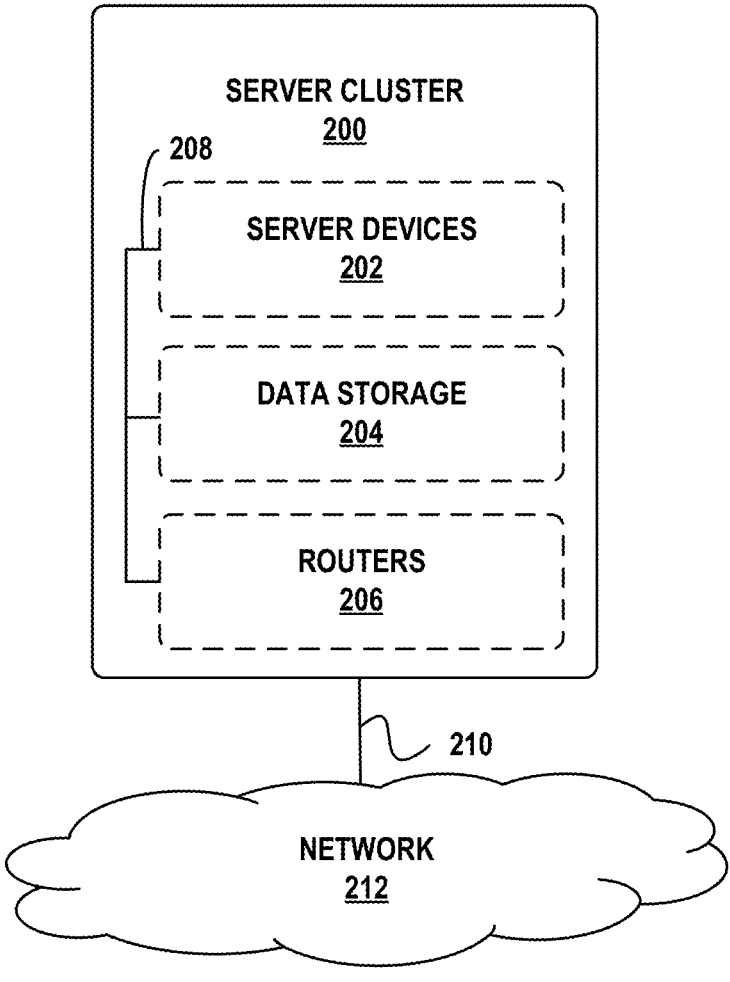
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK
MANAGEMENT ARCHITECTURE

Figure 3:
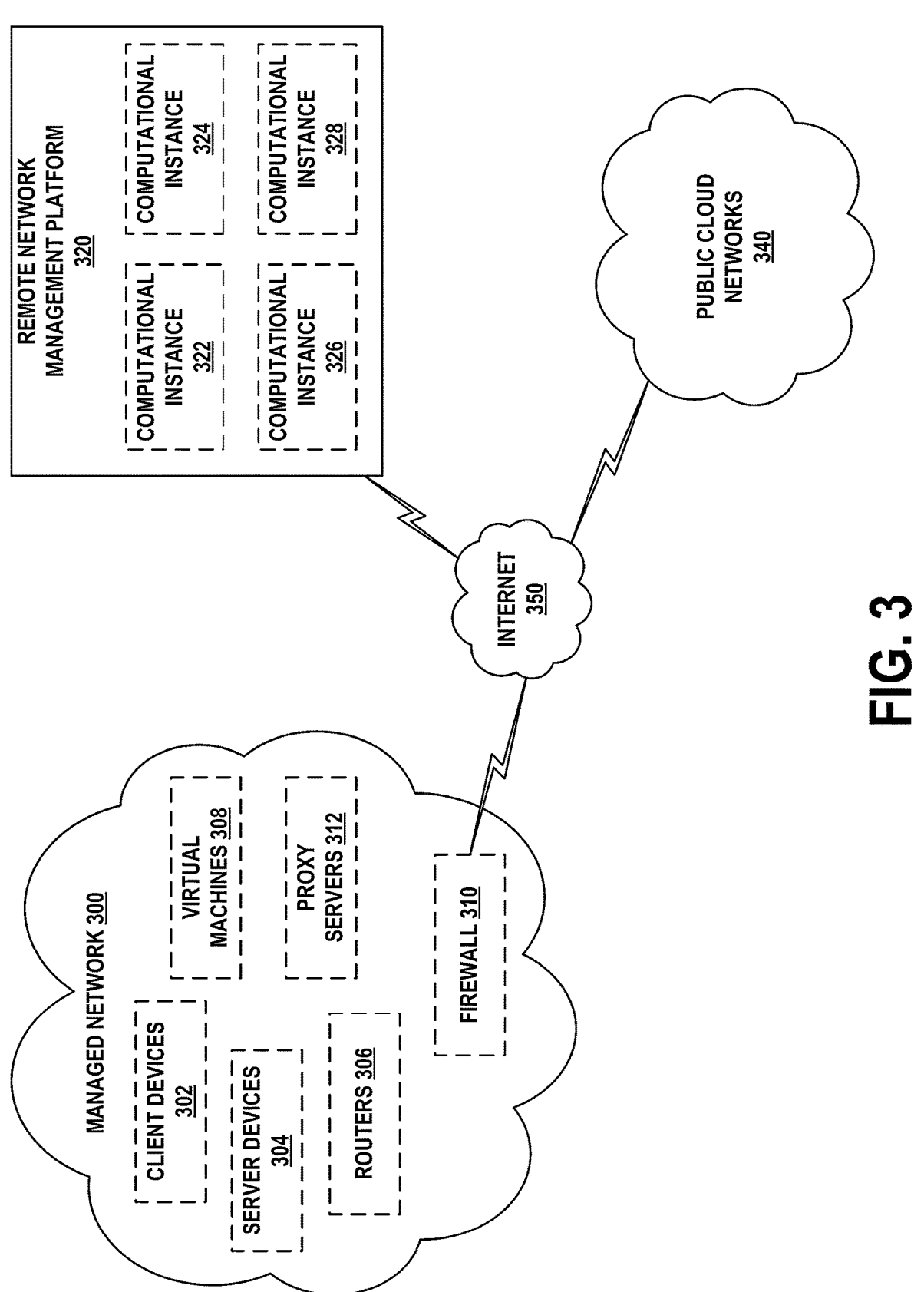
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
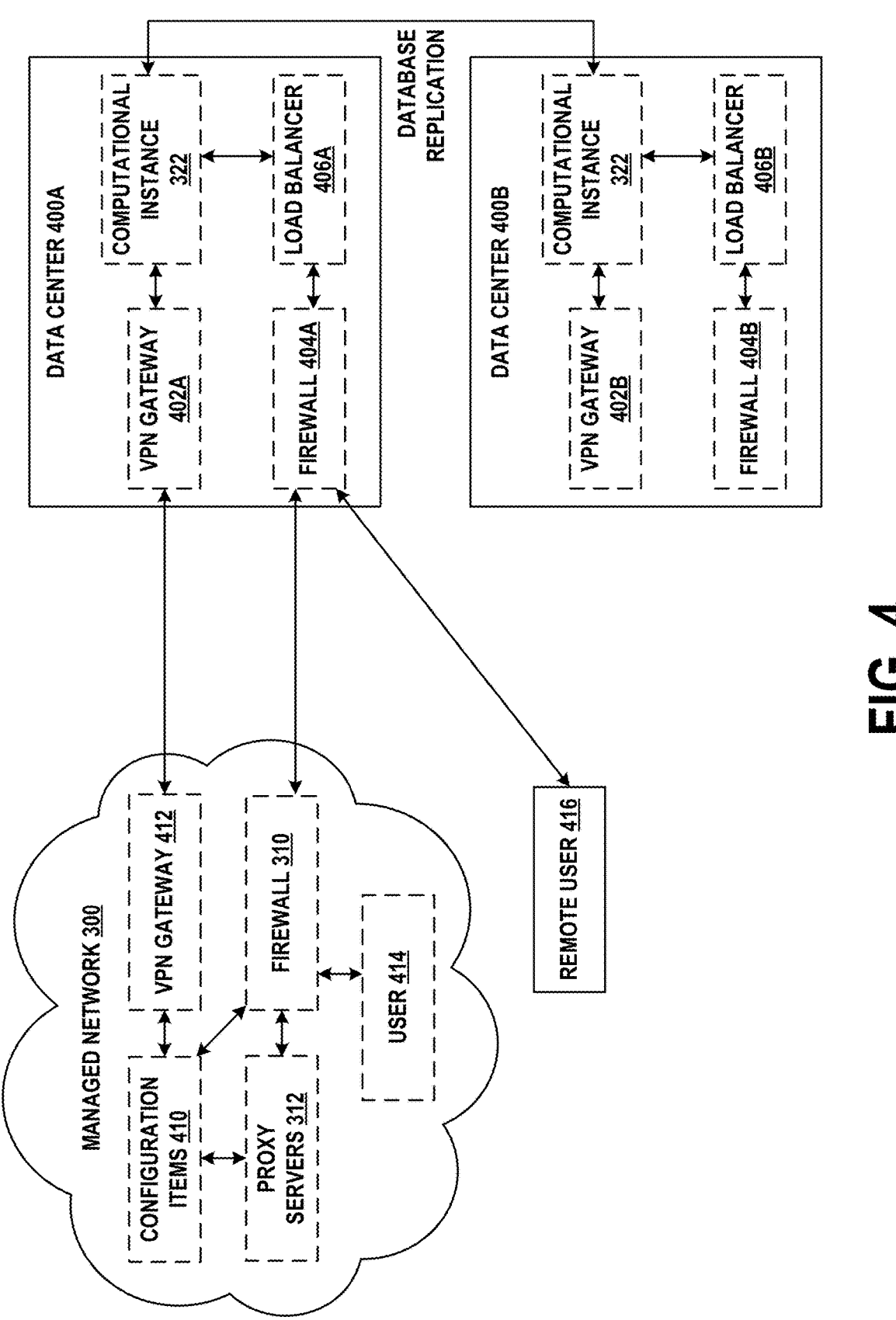
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. EXAMPLE DISCOVERY

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
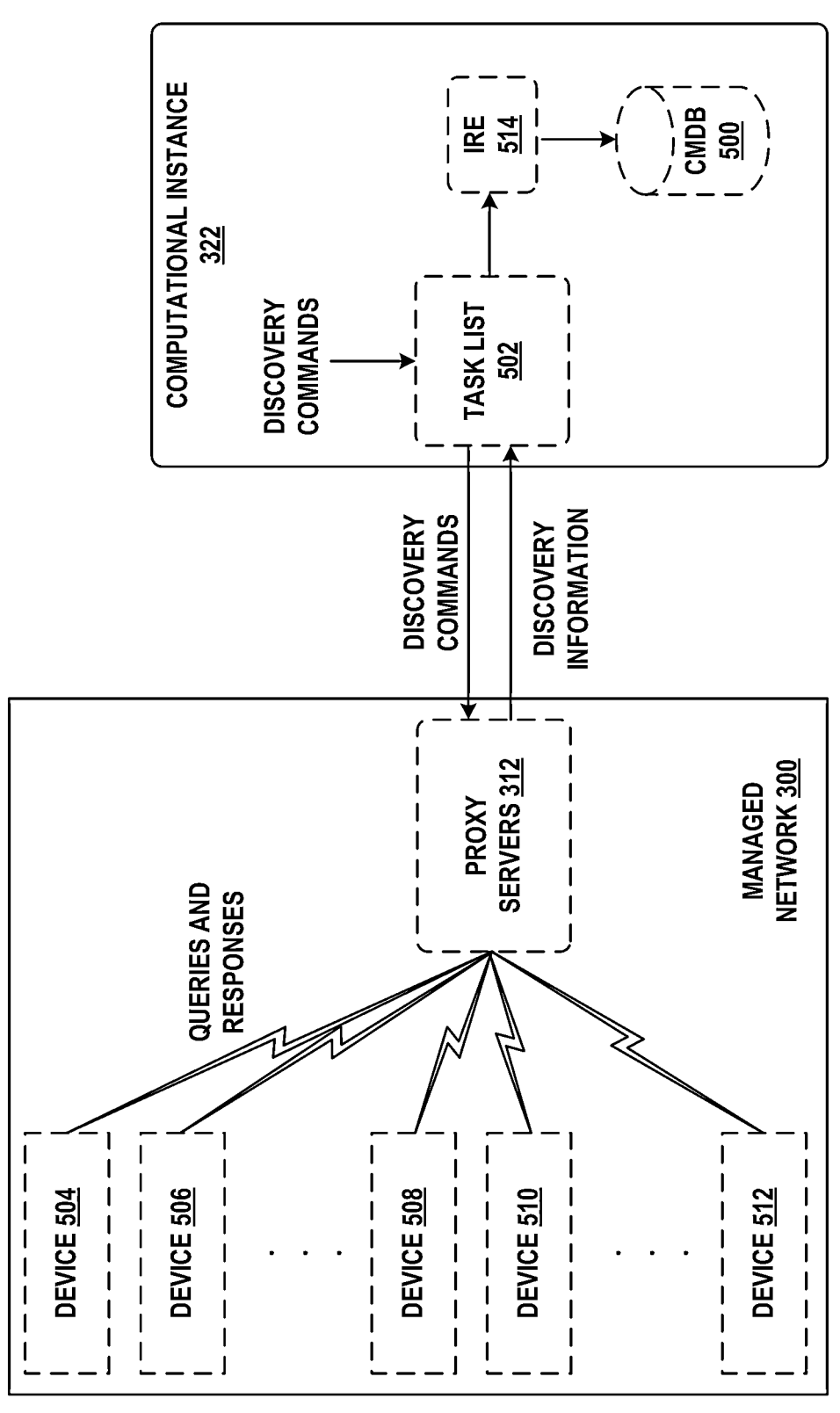
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery-horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases-under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB IDENTIFICATION RULES AND RECONCILIATION

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. EXAMPLE AUTOMATED FILE INFORMATION POPULATION

It is desirable in a variety of applications to generate reports or other files that include both human-language text (e.g., providing context, organizing the structure of the report, providing human-interpretable analyses or conclusions) and measurements or other data (e.g., numerical data, classifications, charts) to support the text. Such reports can be generated manually, by copying the relevant data from data sources (e.g., databases) and optionally performing computations on the data (e.g., generating a mean of a plurality of data points across a year or other time period). However, such manual operation can take significant time, is susceptible to errors, is difficult to audit, and can be rendered out of date (e.g., by updates to the underlying data sources), requiring the data to be updated.

Embodiments described herein provide improvements by including, in a report file, both text and metadata that indicates the particulars of information to be inserted into the text as well as the location(s) within the text at which to insert the information. Such metadata can represent the data source(s) in part with respect a database to access in order to generate the information to be inserted into the text. Such metadata can be evaluated in an automated fashion to generate the information and to insert that information into the text of the report, reducing the time to generate the report from the file, reducing the likelihood of the information being copied and/or generated (e.g., from multiple underlying data source) erroneously, and allowing the information to be quickly and easily updated to reflect any changes in the underlying data sources from which the information is generated/copied. Such metadata in a file also facilitates auditing, by providing a record of the source(s) of the data used to generate the information inserted into a report and optionally additional information (e.g., a method used to generated the information from multiple underlying data sources, a timing of access of such data sources and/or generation of the information therefrom, an identity of a person who initiated the generation and insertion of the information into the report).

FIG. 6 depicts a representation of a portion of text of a report as described herein, with various information inserted at respective locations within text of the report. So, for example, the report includes text like "Scope 1" and information "1915." The report file additionally includes metadata (not shown) which indicates data source(s) that can be used/accessed to obtain the information and/or that indicates a manner of generation of such information from such data source(s). The metadata also indicates the location within the text of the report to insert such information (to the right of the text "Scope 1" as shown in FIG. 6). Such metadata may represent additional information (e.g., various other $CO_2$ emissions figures, e.g., "1401," "117722") and respective additional locations within the text of the report at which to insert such additional information. Alternative methods for generating such a report include manually copying the relevant information from data sources and/or manually generating the information from multiple data sources (e.g., an average of a particular measure across every month of a year) and then manually inputting the generated information. Such a method is time intensive and susceptible to error. Additionally, such a method is not amenable to frequent re-population of the report information, e.g., to ensure that the information in a report reflects the most recently available data prior to sending. In contrast, the methods described herein facilitate fast, accurate population of the information in reports with significantly reduced effort and in a manner that is amenable to repeated re-population of such information as the underlying data sources are made available and/or updated.

The metadata of such methods, which specifies the information of a report as well as the locations within the text of the report to insert such information, can specify the information as a function of one or more data sources in a database (e.g., a series of measurements, one for each month of a year, to access and average in order to generate a yearly average of the measurements for insertion into a report). Such metadata can also specify additional information, e.g., a frequency with which to attempt to update such information, a timing at which the information currently stored in the report was generated (e.g., to determine whether such information should be updated and/or to facilitate auditing of the report), an identity of a person who last initiated such generation of the information from underlying data sources, and/or some other information.

The contents of such metadata could be specified by a user, e.g., using a user interface of a word processor. FIG. 7 depicts an example of such a user interface, which allows a user to specify the type of information to be inserted at a particular location within text of a report ("Configuration Item"), the definition of the information to be inserted ("Scope 1 emissions"), the scope of data sources to use to generate the information ("Entity"), the scope of time to use to generate the information ("Time dimension" and "Year"), and the formatting of the information when inserting it into the text ("Value to insert"). Note that some of these user interface elements may be dependent upon the user's inputs for other elements. For example, the user setting "Time dimension" to "Year" may result in the element immediately below to be "Year" and to provide various years (e.g., "2020") as possible selections, while the user setting "Time dimension" to "Month" may result in the element immediately below to be "Month" and to provide various months (e.g., "February 2020," "March 2020") as possible selections. Once the user has completed specifying the information to be inserted, the metadata can be updated to reflect the user's specification (e.g., as a result of the user clicking the "Add" element of the user interface depicted in FIG. 7). This could include adding to the metadata one or more commands (e.g., SQL commands) that could be transmitted to server, database, or other system to be natively executed in order to generate, in whole or in part, the information to be inserted into the text of the report.

Note that the user interface of FIG. 7, and the aspects of metadata specification represented thereby, are intended as a non-limiting example both of a user interface for specifying such metadata and of the type of information that a user could specify about such metadata and/or about the information represented thereby. For example, a user could specify a set of data sources to access to generate information (e.g., $CO_2$ emissions for each month across a specified year) and a manner of computation to be applied to such data sources in order to generate the information that is then inserted into the text of a report. For example, the user could specify that a mean, median, mode, maximum, minimum, variance, sum, or some other function of the data sources be determined to generate the information, and the metadata of the report file could then be updated to reflect the user's specification.

Thus, there are many examples wherein the metadata represents a single pieces of information (e.g., a mean energy use across a year or other period of time, a total energy use across a number of sites within a geographical region or administrative unit) that is represented on a source database as many individual pieces of information (e.g., a daily total energy use for each day spanning a year or other period of time). In such scenarios, a portion of the metadata in a file can represent the data sources from which to access the many individual pieces of information and how to generate the particular information from the data sources (e.g., performing an average), but only the determined final piece of information (e.g., the average energy use) is stored in the file with the text/metadata of the file. This has the benefit of reducing storage costs for the file while also allowing the file to represent the full set of source data used to generate the information in the file, facilitating auditing of the file and/or regeneration of the inserted information to reflect updates to the underlying source data.

Metadata of a file as described herein may specify many pieces of information for insertion into the text of the file, and each of those pieces of information may be generated from a respective set of many underlying data sources. Accordingly, the process of evaluating such metadata to generate all of the pieces of information can use a great deal of bandwidth to communicate with a database or other system(s) storing the underlying data sources and/or a great deal of computation to generate, from such underlying data sources, the information to be inserted into the text of a report file. Such pieces of information can be selectively updated in order to reduce the amount of bandwidth and/or compute needed to accomplish the update. Such selective updating could be done based on user selection of which pieces of information to update. FIG. 8 depicts an example user interface that a user could use to select which pieces of information in a report to update (e.g., by clicking the checkboxes to the left of the description of the pieces of information in the user interface) and/or to select all of the pieces of information to update (e.g., by clicking the check-box next to "Data (40)"). As depicted in FIG. 8, the user interface could provide an indication of the last time each of the pieces of information in a file was updated (e.g., based on a record of such data stored in the file metadata), and the user could use that information to decide which pieces of information to update (e.g., pieces of information that have not been updated since, e.g., before the last time the underlying data sources were generated/updated).

Additionally or alternatively, such selective update could be performed based on a determination of whether the relevant underlying data has been updated since the last update. For example, a query sent to access the data sources underlying a particular piece of information could include an indication of the last time that such a query was made. A server, database, or other system receiving the query could then determine whether the underlying data has changed since that last time and, if it has not, responsively avoid transmitting the underlying data to the requesting system and/or avoid performing any computation to generate the requested piece of information. Thus, the use of bandwidth and/or computational resources may be reduced by not updating requested pieces of information when the requestor system's local version of such information is already up to date (based on the timing of the previous query for such information and the determining that the data sources under-lying that information have not changed since that previous query). In such circumstances, the server, database, or other system receiving the query could transmit a response to the query indicating that the response to the requestor system's previous query is still accurate and up to date relative to the underlying data source(s).

As noted above, metadata in a file as described herein may specify that a great many data sources in a database should be accessed in order to generate a piece of information to be inserted into the file and/or into a report generated there-from. In such examples, it may be desirable to reduce the amount of local storage used for such accessed data sources and/or to reduce the bandwidth used to transmit such data sources from a database or other storage system to a local system where the file is resident. Accordingly, in some embodiments herein a server or other system can receive a query from a remote system (e.g., a user's laptop on which a file as described herein is resident) for data sources specified in metadata of a file on the remote system. The server could then transmit a query for such data sources to a database (which may be resident on the server or on a separate system from the server) and receive the complete set of data sources from the database. The server could then distill the data sources (e.g., by determining an average, a minimum, a maximum, etc.) into the information specified by the metadata and transmit to the remote system the specified information distilled from the data sources.

Figure 9:
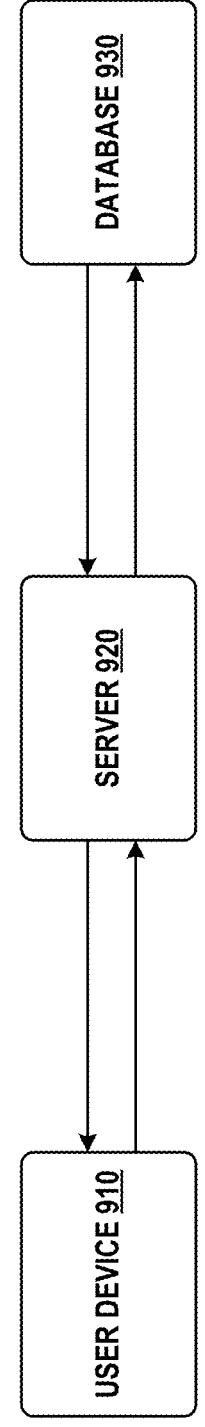
FIG. 9 depicts aspects of an example system, in accordance with example embodiments.

FIG. 9 depicts a set of systems in communication that could implement such a scenario. A user device 910 (e.g., a laptop, an office personal computer) is in communication with a server 920. The user device 910 could run a word processor or other programs to implement some or all of the methods described herein. The user device 910 could also have stored thereon one or more files (e.g., report files) as described herein and program(s) of the user device 910 (e.g., the word processor) could be programmed to allow a user to interact with such files (e.g., to modify or view text of such files, to modify metadata of such files to specify information to be inserted into the text of such files, to initiate the generation and/or updating of such information by transmit-ting queries therefor to the server 920). The server 920 is also in communication with a database 930 on which is stored a variety of data sources that could be specified, as described elsewhere herein, by metadata of file(s) on the user device 910 as sources to determine information to be inserted into text of the file(s).

The server 920 could be the same system that maintains the database 930. For example, the database 930 could be data stored on, e.g., a hard drive of the server 920 and/or programming or logic resident on the server 920 to facilitate database operations on data of the database 930. Addition-ally or alternatively, the server 920 could be in privileged communication with a system that maintains the database 930. For example, the server 920 and database 930 system could be on the same network or otherwise in more secure communication than the communication between the server 920 and the user device 910.

When metadata of such a file is evaluated by the user device 910 to generate and/or update information in the file, the user device 910 could transmit a query to the server 920 related to the information. Such a query could specify data sources in the database 930 to access to generate the information, a method (e.g., mean, median, or mode) to apply to multiple such data sources to generate the infor-mation, an identity and/or credential of a user requesting the information, a site or location form which the information is being requested, a time at which such information was last requested by the user device 910 (e.g., representing how current or out of date a version of the requested information already present on the user device 910 may be), a native command (e.g., a SQL query) to be executed to implement some aspect of the query, or some other information related to the requested information. In response to receiving such a query from the user device 910, the server 920 could send a request to the database 930 for the data sources underlying the information represented by the user device 910 request. Where the server 920 is a separate system from the system that maintains the database 930, this could include trans-mitting a communication over a network or other commu-nications infrastructure between the two separate systems. Where the server 920 itself maintains the database 930, this could include generating an API call, database query, or other programmatic action between programs or other aspects of the server 920. The request sent by the server 920 to the database 930 could be part of the query received by the server 920 form the user device 910 (e.g., a command present in the user device 910 request). Additionally or alternatively, the server 920 could interpret the query received from the user device 910 to determine the contents of the request sent by the server 920 to the database 930. For example, the query from the user device 910 could include a request for a total amount of $CO_2$ generated in a particular calendar year, and the server 920 could convert this request into a query to the database 930 for the amounts of $CO_2$ generated in each month of the requested calendar year, or for the amounts of $CO_2$ generated in each day of the requested calendar year.

Upon receiving the requested data sources from the database 930, the server 920 could then determine the information requested by the user device 910 and send the determined information to the user device 910. This could include, e.g., summing all of the received amounts of $CO_2$ generated in each month of the requested calendar year, or summing the amounts of $CO_2$ generated in each day of the requested calendar year, to generate the requested total amount of $CO_2$ generated in the particular calendar year. In this way, the information sent to and stored by the user device 910 is reduced. Such communications bandwidth use may also be reduced by the server 920 acting to determine whether the requested update should be performed at all. For example, the query received by the server 920 from the user device 930 could include an indication of the last time the query was sent (thus indicating how 'current' the requested information already present on the user device 910 is). The server 920 could then send a query to the server 930 as to the last time that the data source(s) underlying the requested information were updated. If none of the underlying data sources have been updated since prior to the indicated timing of the last query (indicating that the result of the last query stored on the user device 910 is current and accurate), the server 920 could decline to send the requested information, reducing bandwidth use.

As noted above, the server could maintain the database, could be collocated with a system that maintains the database, or could be configured in some other way to have an improved (e.g., higher-bandwidth, lower cost, more secure) connection with the database. This can provide security or other benefits with respect to the security of the underlying data sources relative to transmitting such information directly to the user device 910. The server 920 could also implement access controls or other security features, augmenting data privacy and security by allowing individual users to have authorization to access summary data (e.g., averages, minimums, maximums) or other information determined from underlying data sources (e.g., summary data at certain temporal resolutions, like at a monthly level for daily source data, or at an annual level for monthly source data) without providing access to the raw data sources underlying such summary or otherwise derived data.

Such authorization could be implemented by receiving user credential data (e.g., passwords, usernames, two-factor validation) to identify a user and/or to identify the level of access of the user. In some examples, the user credential data could be used to authenticate an ongoing session (e.g., by the server 920 authenticating the received user credential data and thus authorizing information to be provided to the user device 910 within the context of the authenticated session). Additionally or alternatively, such user credential data could be applied to determine which queries, or which aspects of an individual query, are authorized by the user credential data and thus should be serviced. For example, if a query from the user device 910 includes requests for multiple pieces of information, each request could be individually authenticated, and a response to each request only sent back to the user device 910 if it is determined that the user credential data authorizes the user to access the data (e.g., the data source) specified by the request.

As noted above, the interposition of the server 920 between the user device 910 and the database 930 allows user credential data authorize a user to access information that is not specifically stored on the database 930 but is, instead, derived from such data. For example, a user may have authorization to access summary data of underlying raw data sources at a specified level of resolution, while not having authorization to access the underlying raw data sources (e.g., the user may have authorization to access total $CO_2$ generation data at a monthly or annual resolution, without having access to underlying weekly/daily data). The server 920 itself may have authorization to access the full scope of data on the database 930 (or at least a wider scope of data than particular users), allowing it to access the necessary underlying data sources to generate the derived information that a particular user may be authorized to access. The server 920 can then send that derived information to the user device 910, satisfying the query from the user device 910.

Such an interposed server 920 could also facilitate a variety of other information-generation functionalities. For example, the server 920 could determine the location or site of the user device 910 (e.g., based on contents of a query received from the user device 910, based on location or site information associated with user credential data, based on an IP address or other information associated with a communication link to the user device 910) and then satisfy queries from the user device 910 in a location or site-based manner. For example, a query for information related to $CO_2$ generation could be satisfied by the server 920 by accessing data sources on $CO_2$ generation on the database 930 related to $CO_2$ generation by the site or location determined for the user device 910 (e.g., region- or administrative unit-level $CO_2$ generation values for the region or administrative unit that encompasses the site/location determined for the user device 910).

Additionally, a file as described herein may include metadata specifying many different pieces of inserted information that reference data sources that may have different credential requirements. This is because, e.g., such metadata may reference data representing a wide variety of aspects of operation of a managed network, organization, or other system. Accordingly, it can be difficult to allow such a file on a user's computer or other system to be able to access all of the data sources referenced by the metadata therein while also maintaining appropriate security and access control for such data. For example, it could be the case that no individual user has the necessary authorization to access all of the data sources referenced in a file, and even if they did, it could be cumbersome to require that person to perform all of the file information updates. Instead, the embodiments described herein may operate based on user credential data provided by users to access and update only those portions of the metadata that reference data sources that the current user credential data can access. The process of expanding or otherwise modifying the file to modify or add to the metadata therein can also be keyed to the current user credential data, only providing a user with the option to specify data sources that the user has authorization to access. Such operation can also reduce bandwidth and/or storage requirements by only accessing the subset of the data sources that are accessible using the current user credential data; since different users likely have authorization to access non-overlapping sets of data sources, the overall bandwidth and storage use for multiple different users to update the file at different times will likely be reduced.

VII. EXAMPLE TECHNICAL IMPROVEMENTS

These embodiments provide a technical solution to a technical problem. One technical problem being solved is the population and maintenance of inline database-sourced information in textual reports. In practice, this is problematic because this process can be expensive with respect to communications bandwidth, local storage space, the security and/or privacy of the data sources underlying such information, the auditability of such information-bearing reports, the accuracy of such information relative to underlying database sources, and user time to generate such reports.

In the prior art, such reports were generated manually, by human operators accessing and manually copying data from databases and/or manually generating information from such data sources (e.g., by determining sums, averages, etc.) and manually inserting such information into the text of reports. However, these techniques exhibit significant time costs, reduced accuracy, exposure of sensitive underlying data sources to human users, and inability to quickly and accurately update information in reports as the underlying database data sources are generated and/or updated. Moreover, such human interaction involves subjectivity and variability, resulting in widely different output forms from person to person.

The embodiments herein overcome these limitations by using metadata within a report file to specify information to be inserted into metadata-specified locations within the text of the report file. Such metadata can be evaluated to generate queries to databases, servers, and/or other systems for information to be inserted into such report files and the information in responses to such queries can be inserted into text of the report files, thereby being stored in the report files. This allows for a variety of improvements, including fast, repeated update of the information in such report files (e.g., as the data sources underlying such information are generated and/or updated), improved accuracy of such information, and improved auditability of such reports (as the metadata therein specifies the source of data sources underlying the information in the report as well as the method of generating the information from the underlying data sources). This also provides a benefit of reducing the amount of storage space required by only storing the derived information in the report file, rather than the full set of data sources used to generate such information (e.g., only storing a single value for the sum of $CO_2$ generated across a year, rather than storing each and every daily $CO_2$ generated value for each day of the year). This can also provide a benefit of reducing bandwidth use where the query interpretation and information derivation is performed by a server (e.g., a server that also maintains the database containing the underlying data sources), so that the server only uses a reduced amount of bandwidth to transmit the derived information to a user device, rather that transmitting the full set of data sources used to generated such requested information.

The embodiments herein also provide for various security and privacy benefits with respect to the data sources underlying the information to be inserted into a report file. This can include keying access to data sources and/or information derived therefrom to permissions represented by user credential data for a user. This can include user credential data specifying authorization to access only summary data (e.g., summary data at a specified temporal resolution) and not the data sources from which such summary data is derived. Where a server is interposed between a requestor user device and the database containing the underlying data sources, such a server can facilitate such data access credentialing by having, itself, authorization to access the underlying data sources of a database while only providing access to information derived from those data sources according to each user's credential data. Such an intervening server can also provide enhanced security by being coupled to a corresponding database via a secured network, VPN, or other enhanced-security link(s). This allows the full set of underlying data from the database to be transferred to the server only via such an enhanced-security channels while only the summary or other information derived therefrom is transmitted from the server to a user's device (e.g., via relatively less secure links over the internet).

Other technical improvements may also flow from these embodiments, and other technical problems may be solved. Thus, this statement of technical improvements is not limiting and instead constitutes examples of advantages that can be realized from the embodiments.

VIII. EXAMPLE OPERATIONS

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

The embodiments of FIG. 10 include obtaining text and metadata associated with the text, wherein the metadata indicates a plurality of locations within the text to insert respective information, and respective data sources within a database from which to determine the respective information (1010).

The embodiments of FIG. 10 also include receiving an input to update information of a specified location of the locations (1020).

The embodiments of FIG. 10 additionally include, responsive to receiving the input, transmitting a query to the database for a data source specified by the metadata for the specified location (1030).

The embodiments of FIG. 10 further include receiving, from the database, a response to the query (1040).

The embodiments of FIG. 10 yet further include, based on the response, updating the information in the text at the specified location (1050).

The embodiments of FIG. 10 could include additional or alternative steps or elements. For example, the embodiments of FIG. 10 could additionally include (i) obtaining user credential data; and (ii) authenticating a session using the user credential data, wherein transmitting the query to the database and receiving the response to the query from the database occur within the session. Additionally or alternatively, the embodiments of FIG. 10 could additionally include obtaining user credential data, wherein receiving the input to update the information of the specified location comprises receiving a further input to update information of a set of the locations that includes the specified location, and wherein transmitting the query to the database is performed responsive to (i) receiving the input and (ii) determining that the user credential data authorizes access to the data source specified by the metadata for the specified location.

In some examples, obtaining the metadata associated with the text includes: (i) obtaining a manifest of data sources available within the database; (ii) providing, to a user, a user interface that displays an indication of the data sources available within the database; (iii) receiving, from the user via the user interface, user input that includes a selection of the data source and information determined therefrom specified by the metadata and a further indication of a location within the text to insert the information; and (iv) updating the metadata associated with the text based on the user input.

In some examples, transmitting the query to the database includes transmitting the query from a specific site of a set of sites, and wherein the response to the query received from the database includes information specific to the specific site.

In some examples, the metadata for the specified location includes a database command to access the data source specified by the metadata for the specified location, and wherein transmitting the query to the database comprises transmitting the database command to the database.

In some examples, the data source specified by the metadata for the specified location includes a plurality of database entries, the embodiments of FIG. 10 further include determining the information specified by the metadata for the specified location from the plurality of database entries, and updating the information in the text at the specified location does not include storing the plurality of database entries in the metadata. For example, determining the information specified by the metadata for the specified location from the plurality of database entries can include determining at least one of a minimum, a maximum, a mean, a median, or a mode of the plurality of database entries. Additionally or alternatively, transmitting the query to the database for the data source specified by the metadata for the specified location can include: (i) transmitting a first query for the data source specified by the metadata for the specified location from a remote system to a server; and (ii) transmitting, by the server in response to receiving the first query, a second query for the data source specified by the metadata for the specified location to the database, and receiving the response to the query from the database can include: (i) receiving, by the server from the database, a first response to the second query that includes the plurality of database entries, wherein determining the information specified by in the metadata for the specified location from the plurality of database entries is performed by the server; and (ii) receiving, by the remote system from the server, the information specified by the metadata for the specified location that was determined by the server from the plurality of database entries.

In some examples, transmitting the query to the database for the data source specified by the metadata for the specified location can include: (i) transmitting a first query for the data source specified by the metadata for the specified location from a remote system to a server; and (ii) transmitting, by the server in response to receiving the first query, a second query for the data source specified by the metadata for the specified location to the database, and receiving the response to the query from the database can include: (i) receiving, by the server from the database, a first response to the second query that includes the data source specified by the metadata for the specified location; and (ii) receiving, by the remote system from the server, a second response that includes the information specified by the metadata for the specified location.

IX. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
obtaining text and metadata associated with the text, wherein the metadata indicates a plurality of locations within the text to insert respective information, and respective data sources within a database from which to determine the respective information;
obtaining first user credential data for a first user;
receiving, from the first user, a first input to update information of a first set of the locations that includes a first specified location and a second specified location of the locations;
responsive to (i) receiving the first input and (ii) determining that the first user credential data authorizes access to a data source specified by the metadata for the first specified location and not the second specified location, transmitting a first query to the database for the data source specified by the metadata for the first specified location and not the second specified location;
receiving, from the database, a first response to the first query;
based on the first response, updating the information in the text at the first specified location;
obtaining second user credential data for a second user;
receiving, from the second user, a second input to update information of a second set of the locations that includes the second specified location of the locations;
responsive to (i) receiving the second input and (ii) determining that the second user credential data authorizes access to a data source specified by the metadata for the second specified location, transmitting a second query to the database for the data source specified by the metadata for the second specified location;
receiving, from the database, a second response to the second query; and
based on the second response, updating the information in the text at the second specified location.
2. The method of claim 1, further comprising:
authenticating a session using the first user credential data for the first user, wherein transmitting the first query to the database and receiving the first response to the first query from the database occur within the session.
3. The method of claim 1, wherein obtaining the metadata associated with the text comprises:
obtaining a manifest of data sources available within the database;
providing, to a third user, a user interface that displays an indication of the data sources available within the database;
receiving, from the third user via the user interface, user input that includes a selection of the data source and information determined therefrom specified by the metadata and a further indication of a location within the text to insert the information; and
updating the metadata associated with the text based on the user input.
4. The method of claim 1, wherein transmitting the first query to the database comprises transmitting the first query from a specific site of a set of sites, and wherein the first response to the first query received from the database includes information specific to the specific site.
5. The method of claim 1, wherein the metadata for the first specified location includes a database command to access the data source specified by the metadata for the first specified location, and wherein transmitting the first query to the database comprises transmitting the database command to the database.
6. The method of claim 1, wherein the data source specified by the metadata for the first specified location comprises a plurality of database entries, wherein the method further comprises determining the information specified by the metadata for the first specified location from the plurality of database entries, and wherein updating the information in the text at the first specified location does not include storing the plurality of database entries in the metadata.
7. The method of claim 6, wherein determining the information specified by the metadata for the first specified location from the plurality of database entries comprises determining at least one of a minimum, a maximum, a mean, a median, or a mode of the plurality of database entries.
8. The method of claim 6, wherein transmitting the first query to the database for the data source specified by the metadata for the first specified location comprises:
transmitting a third query for the data source specified by the metadata for the first specified location from a remote system to a server; and
transmitting, by the server in response to receiving the third query, a fourth query for the data source specified by the metadata for the first specified location to the database, and
wherein receiving the first response to the first query from the database comprises:
receiving, by the server from the database, a third response to the fourth query that includes the plurality of database entries, wherein determining the information specified by the metadata for the first specified location from the plurality of database entries is performed by the server; and
receiving, by the remote system from the server, the information specified by the metadata for the first specified location that was determined by the server from the plurality of database entries.

9. The method of claim 1 wherein transmitting the first query to the database for the data source specified by the metadata for the first specified location comprises:

transmitting a third query for the data source specified by the metadata for the first specified location from a remote system to a server; and transmitting, by the server in response to receiving the third query, a fourth query for the data source specified by the metadata for the first specified location to the database, and wherein receiving the first response to the first query from the database comprises:

receiving, by the server from the database, a third response to the fourth query that includes the data source specified by the metadata for the first specified location; and receiving, by the remote system from the server, a fourth response that includes the information specified by the metadata for the first specified location.

10. A non-transitory computer-readable medium, having stored thereon program instructions that, upon execution by a computing system, cause the computing system to perform operations comprising:

obtaining text and metadata associated with the text, wherein the metadata indicates a plurality of locations within the text to insert respective information, and respective data sources within a database from which to determine the respective information;

obtaining first user credential data for a first user;

receiving, from the first user, a first input to update information of a first set of the locations that includes a first specified location and a second specified location of the locations;

responsive to (i) receiving the first input and (ii) determining that the first user credential data authorizes access to a data source specified by the metadata for the first specified location and not the second specified location, transmitting a first query to the database for the data source specified by the metadata for the first specified location and not the second specified location;

receiving, from the database, a first response to the first query;

based on the first response, updating the information in the text at the first specified location;

obtaining second user credential data for a second user;

receiving, from the second user, a second input to update information of a second set of the locations that includes the second specified location of the locations;

responsive to (i) receiving the second input and (ii) determining that the second user credential data authorizes access to a data source specified by the metadata for the second specified location, transmitting a second query to the database for the data source specified by the metadata for the second specified location;

receiving, from the database, a second response to the second query; and based on the second response, updating the information in the text at the second specified location.

11. The non-transitory computer-readable medium of claim 10, wherein the operations further comprise:

authenticating a session using the first user credential data for the first user, wherein transmitting the first query to the database and receiving the first response to the first query from the database occur within the session.

12. The non-transitory computer-readable medium of claim 10, wherein the data source specified by the metadata for the first specified location comprises a plurality of database entries, wherein the operations further comprise determining the information specified by the metadata for the first specified location from the plurality of database entries, and wherein updating the information in the text at the first specified location does not include storing the plurality of database entries in the metadata.

13. The non-transitory computer-readable medium of claim 12, wherein transmitting the first query to the database for the data source specified by the metadata for the first specified location comprises:

transmitting a third query for the data source specified by the metadata for the first specified location from a remote system to a server; and transmitting, by the server in response to receiving the third query, a fourth query for the data source specified by the metadata for the first specified location to the database, and wherein receiving the first response to the first query from the database comprises:

receiving, by the server from the database, a third response to the fourth query that includes the plurality of database entries, wherein determining the information specified by in the metadata for the first specified location from the plurality of database entries is performed by the server; and receiving, by the remote system from the server, the information specified by the metadata for the first specified location that was determined by the server from the plurality of database entries.

14. The non-transitory computer-readable medium of claim 10 wherein transmitting the first query to the database for the data source specified by the metadata for the first specified location comprises:

transmitting a third query for the data source specified by the metadata for the first specified location from a remote system to a server; and transmitting, by the server in response to receiving the third query, a fourth query for the data source specified by the metadata for the first specified location to the database, and wherein receiving the response to the first query from the database comprises:

receiving, by the server from the database, a third response to the fourth query that includes the data source specified by the metadata for the first specified location; and receiving, by the remote system from the server, a fourth response that includes the information specified by the metadata for the first specified location.

15. A system comprising:

one or more processors; and memory, containing program instructions that, upon execution by the one or more processors, cause the system to perform operations comprising:

obtaining text and metadata associated with the text, wherein the metadata indicates a plurality of locations within the text to insert respective information, and respective data sources within a database from which to determine the respective information;

obtaining first user credential data for a first user;

receiving, from the first user, a first input to update information of a first set of the locations that includes a first specified location and a second specified location of the locations;

responsive to (i) receiving the first input and (ii) determining that the first user credential data authorizes access to a data source specified by the metadata for the first specified location and not the second specified location, transmitting a first query to the database for the data source specified by the metadata for the first specified location and not the second specified location;

receiving, from the database, a first response to the first query;

based on the first response, updating the information in the text at the first specified location;

obtaining second user credential data for a second user;

receiving, from the second user, a second input to update information of a second set of the locations that includes the second specified location of the locations;

responsive to (i) receiving the second input and (ii) determining that the second user credential data authorizes access to a data source specified by the metadata for the second specified location, transmitting a second query to the database for the data source specified by the metadata for the second specified location;

receiving, from the database, a second response to the second query; and based on the second response, updating the information in the text at the second specified location.

16. The system of claim 15, wherein the operations further comprise:

authenticating a session using the first user credential data for the first user, wherein transmitting the first query to the database and receiving the first response to the first query from the database occur within the session.

17. The system of claim 15, wherein the data source specified by the metadata for the first specified location comprises a plurality of database entries, wherein the operations further comprise determining the information specified by the metadata for the first specified location from the plurality of database entries, and wherein updating the information in the text at the first specified location does not include storing the plurality of database entries in the metadata.

18. The system of claim 17, wherein transmitting the first query to the database for the data source specified by the metadata for the first specified location comprises:

transmitting a third query for the data source specified by the metadata for the first specified location from a remote system to a server; and transmitting, by the server in response to receiving the third query, a fourth query for the data source specified by the metadata for the first specified location to the database, and wherein receiving the first response to the first query from the database comprises:

receiving, by the server from the database, a third response to the fourth query that includes the plurality of database entries, wherein determining the information specified by in the metadata for the first specified location from the plurality of database entries is performed by the server; and receiving, by the remote system from the server, the information specified by the metadata for the first specified location that was determined by the server from the plurality of database entries.

19. The system of claim 15 wherein transmitting the first query to the database for the data source specified by the metadata for the first specified location comprises:

transmitting a third query for the data source specified by the metadata for the first specified location from a remote system to a server; and transmitting, by the server in response to receiving the third query, a fourth query for the data source specified by the metadata for the first specified location to the database, and wherein receiving the first response to the first query from the database comprises:

receiving, by the server from the database, a third response to the fourth query that includes the data source specified by the metadata for the first specified location; and receiving, by the remote system from the server, a fourth response that includes the information specified by the metadata for the first specified location.

* * * * *